US007992000B2

(12) United States Patent
Zhou

(10) Patent No.: US 7,992,000 B2
(45) Date of Patent: Aug. 2, 2011

(54) SESSION INITIAL PROTOCOL IDENTIFICATION METHOD

(75) Inventor: Siyi Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 901 days.

(21) Appl. No.: 11/578,611

(22) PCT Filed: Jun. 8, 2005

(86) PCT No.: PCT/CN2005/000806
§ 371 (c)(1),
(2), (4) Date: Oct. 13, 2006

(87) PCT Pub. No.: WO2006/000144
PCT Pub. Date: Jan. 5, 2006

(65) Prior Publication Data
US 2007/0255952 A1 Nov. 1, 2007

(30) Foreign Application Priority Data
Jun. 28, 2004 (CN) .......................... 2004 1 0069510

(51) Int. Cl.
*H04L 9/32* (2006.01)
(52) U.S. Cl. ..................................................... 713/171
(58) Field of Classification Search .................. 726/4–5, 726/27–28; 380/259–260, 262, 283; 713/171, 713/160–161, 169, 176, 185
See application file for complete search history.

(56) References Cited

U.S. PATENT DOCUMENTS

| 6,788,676 B2 * | 9/2004 | Partanen et al. ............... 370/352 |
| 2002/0048351 A1 | 4/2002 | Donovan et al. |
| 2002/0129236 A1 * | 9/2002 | Nuutinen ...................... 713/151 |
| 2003/0014668 A1 * | 1/2003 | Faccin et al. .................. 713/201 |

(Continued)

FOREIGN PATENT DOCUMENTS
CN 1423882 A 6/2003
(Continued)

OTHER PUBLICATIONS

Chou-Chen Yang, Ren-Chiun Wang, Wei-Ting Liu, Secure authentication scheme for session initiation protocol, Computers & Security, vol. 24, Issue 5, Aug. 2005, pp. 381-386, available online Jun. 29, 2005.*

(Continued)

*Primary Examiner* — Gilberto Barron, Jr.
*Assistant Examiner* — Shaun Gregory
(74) *Attorney, Agent, or Firm* — Brinks Hofer Gilson & Lione

(57) ABSTRACT

A Session Initiation Protocol (SIP) authentication method, sends a request message without authentication information to a server end from a client to request for access; sends back a response message, which contains authentication exchange information and DH authentication response information of the server end when the server end receives the request message; authenticates the received response message by the client and sending a request message, which contains authentication information of the client, to the server end after the authentication is passed; authenticates a user according to the received request message by the server end, and sends back a response message which contains the authentication information of the server end; authenticates the legality of the server end by the user according to the received response message, which contains the authentication information of the server end.

10 Claims, 3 Drawing Sheets

U.S. PATENT DOCUMENTS

| | | | | |
|---|---|---|---|---|
| 2003/0200431 | A1* | 10/2003 | Stirbu | 713/168 |
| 2003/0200433 | A1* | 10/2003 | Stirbu | 713/169 |
| 2003/0217165 | A1* | 11/2003 | Buch et al. | 709/229 |
| 2006/0143696 | A1 | 6/2006 | Faccin et al. | |

FOREIGN PATENT DOCUMENTS

| | | |
|---|---|---|
| CN | 1483265 A | 3/2004 |
| CN | 1716953 B | 9/2010 |
| EP | 1267548 A2 | 12/2002 |
| EP | 1267548 A3 | 12/2002 |
| WO | 03/091891 | 11/2003 |
| WO | 2004/021655 | 3/2004 |

OTHER PUBLICATIONS

SIP-based media communication system security technology, Tonji University, "data communication," (2004) No. 2.

SIP Protocol-based network security analysis, Wuhan University, "computer engineering and design" (2004).

Telecommunications and Internet Protocol Harmonization Over Networks (Tiphon, Technology Compliance Specification, ETSI Standards, European Telecommunications Standards Institute, Sophia-Antipo, Fr, vol. Tiphon-6, No. V211, Oct. 2003 XP014016120, Issn: 0000-0001, pp. 193-200.

Rosenberg, J., et al., SIP: Session "Initiation Protocol", IETF Standard, Internet Engineering Task Force, IETF, CH, Jun. 2002, ISSN: 0000-0003, pp. 193-200.

Office Action issued in corresponding Chinese Patent Application No. 200410069510.0; mailed Oct. 17, 2008.

Written Opinion of the International Searching Authority issued in corresponding PCT Application No. PCT/CN2005/000806; mailed Sep. 22, 2005.

Office Action issued in corresponding European Patent Application No. 05 752 252.6; mailed Nov. 14, 2007.

Office Action issued in corresponding European Patent Application No. 05 752 252.6; mailed Jun. 17, 2008.

Franks, J. et al. "HTTP Authentication: Basic and Digest Access Authentication" The Internet Society. Jun. 1999.

Rosenberg, J. et al. SIP: Session Initiation Protocol: The Internet Society. Jun. 2002.

* cited by examiner

SESSION INITIAL PROTOCOL IDENTIFICATION METHOD

FIELD OF THE INVENTION

The invention relates to the field of network security technique, and in particular, to a Session Initiation Protocol (SIP) authentication method.

BACKGROUND OF THE INVENTION

With the development of the Internet and Next Generation Network (NGN), whose convenient access, gradually improved access speed, easy-to-extend feature, and abundant service functions win favors of the operators and the users. However, people show more and more concerns about security of the Internet and NGN. As the core protocol for NGN, Session Initiation Protocol (SIP) also faces the same challenge in security, for which access authentication is one of the solutions. The existing SIP (RFC 3261) provides a fundamental access authentication approach, i.e., the so-called Digest Authentication.

SIP is featured with simplicity, high extensibility, and tight coupling with Internet applications, by which simple Internet Phone function can be implemented with only 3 messages (INVITE, BYE and ACK). SIP discriminates clients and servers. A client refers to an application program that sends requests to a server and establishes a connection with the server, and is included in a Back-to-Back User Agent (B2B User Agent) and Proxy. A server is an application program that is designed to provide services at client requests and send back a response to the client. There are 4 types of basic servers:

1. B2B User Agent Server: it contacts with the user and sends back a response on behalf of the user on receiving an SIP request.
2. Proxy Server: it is a program that initiates requests on behalf of other clients and serves both as a server and as a client. It can modify the content in an original request message before forwarding the request.
3. Redirect Server: it receives a SIP request, maps the original address in the request into one or more new addresses, and returns it to the client.
4. Registrar Server: it receives registration requests from a client and accomplishes registration of a user address. It is usually necessary for a user terminal program to include both a User Agent Client (UAC) and a User Agent Server (UAS).

The SIP authentication procedure is a stateless Challenge-based mechanism (RFC 3261) similar to the one used in HTTP (Hyper Text Transfer Protocol) which is defined by RFC2617, with the essential idea that the two parties involved in authentication share a user name and an initial key. During the authentication procedure, an authenticating party sends a Challenge to a party to be authenticated which encrypts the user name and the initial key, forms a character string and sends the character string to the authenticating party on receiving the Challenge. The authenticating party obtains a character string by encrypting in the same way the user name and password which it knows, and judges whether the user's password is correct by comparing this character string with that received from the party to be authenticated.

In SIP, an authentication approach of Digest Scheme is used, the flow of which is shown in FIG. 1.

If a UAS (server end) intends to authenticate a UAC (client end), it must send a 401 Unauthorized response which indicates that a client without authorization attempts to access resources or clients that are protected by a password. The 401 Unauthorized response must carry a WWW-Authenticate header field, according to which the UAC displays a user name/key dialog box and sends a request again after an appropriate Authorization header field which carries the authentication information is filled. A registrar server and a redirect server can also use the 401 Unauthorized response to authenticate a UAC.

If a Proxy Server is to authenticate a UAC, it must utilize a 407 Proxy Authentication Required response, which is similar to a 401 and indicates that a client is authenticated by the Proxy Server first and a Proxy-Authenticate header field is carried therein. The UAC can initiate a request again and carry the authentication information in the Proxy-Authorization header field.

When the UAC reinitiates a request on receiving a 401 or 407 response, it usually uses the Call-ID, From header field, and To header field which are identical to those in the previous request, but the sequence number in the Cseq header field is incremented by 1, in other words, requests with the same Call-ID must have incremental Cseq numbers.

That authentication approach provides only the most fundamental access authentication functions, which may have the following drawbacks regarding the network security:

1. The fundamental Digest Authentication Scheme defined in RFC 3261 can only initiate an authentication for a request message from a UAC, but doesn't provide the corresponding authentication scheme for a 401 or 407 response. As the result, a UAC is prone to suffer plain text attacks.
2. Due to the fact that an initial key is used through the RFC 3261 Digest authentication procedure (only the authentication initiated for a Request message from UAC), it may be vulnerable to the dictionary attacks by monitoring and analyzing the (Authorization and Proxy-Authorization) header fields.

SUMMARY OF THE INVENTION

In one aspect of the present invention, there is provided a Session Initiation Protocol (SIP) authentication method, so as to improve the security of network access.

The invention is implemented with the following technical solutions:

A Session Initiation Protocol (SIP) authentication method includes:

sending, by a client end, a first request message without authentication information to a server end to request for access;

sending back, by a server end, a first response message containing authentication exchange information and DH authentication response information of the server end when the server end receives the first request message;

authenticating the first response message by the client end and sending a second request message containing authentication information of the client end, to the server end after the authentication to the server end is passed;

authenticating by the server end a user according to the second request message, and sending back a second response message which contains the authentication information of the server end;

authenticating, by the user, the legality of the server end according to the second response message.

The process of sending back a first response message includes: generating, by the server end, DH authentication response information of the server end according to a user name and an initial key.

The second request message includes: optional authentication exchange information of the client end, and DH authentication response information of the client end.

The process of authenticating the first response message and sending a second request message includes:

obtaining a shared key by the client end according to authentication exchange information of the server end and authentication exchange information of the local end;

generating the DH authentication response information of the client end with the shared key.

The process of authenticating a user according to the second request message and sending back a second response message includes:

authenticating the second request message by the server end according to a user name and an initial key if authentication exchange information of the client end is not included in the header fields of the second request message;

obtaining a shared key by the server end according to the authentication exchange information of the client end and authentication exchange information of the server end, and authenticating the second request message by the server end with the shared key, if the authentication exchange information of the client end is included in the header fields of the second request message.

The process of authenticating a user according to the second request message and sending back a second response message further includes:

generating the DH authentication response information of the server end by the server end according to a user name and an initial key if authentication exchange information of the client end is not included in the header fields of the second request message;

obtaining a shared key by the server end according to the authentication exchange information of the client end and authentication exchange information of the server end, and generating the DH authentication response information of the server end, if authentication exchange information of the client end is included in the header fields of the second request message.

The second response message which contains the authentication information of the server end includes: an optional DH authentication information header field.

The DH authentication information header field includes: the authentication information of the server end.

The method further includes:

encrypting the messages with the shared key when both of the client and server ends perform message interaction with each other after obtaining the shared key.

The server end includes: a proxy server, a back-to-back server, a redirect server, or a registrar server.

It can be seen from the above technical solutions that, in the present invention, a DH (Diffie-Hellman) algorithm on the basis of the existing fundamental SIP authentication approach is introduced, and the SIP header and the fields are extended, so that the initial key is only used in the first interaction step, while the shared key is used in the subsequent authentication steps. In that manner, the initial key is safeguarded, thus preventing the dictionary attacks effectively. In addition, in case either party restarts or wishes to change the shared key, the replay attacks to UAS or Proxy can be prevented effectively by verifying the initial key and utilizing the counter of times of the authentication. With the present invention, network security can be improved significantly.

DETAILED DESCRIPTION OF THE PREFERRED EMBODIMENTS

The core of the present invention lies in that it introduces the DH algorithm and extends the SIP headers and the fields on the basis of existing fundamental SIP authentication approach, and not only an authentication is initiated for a user's request message but also an appropriate authentication mechanism is provided for a response message of the server end, so as to effectively prevent plain text attacks initiated towards the user. In addition, in the method provided in the present invention, the initial key is only used in the first interaction, while a shared key is used for encryption in the subsequent authentication steps, thus effectively preventing the dictionary attacks. Furthermore, in the case either party restarts or wishes to change the shared key, the approach for key verification can be started again, so as to effectively prevent replay attacks and provide compatibility for special situations.

Hereunder the present invention is further detailed with reference to the embodiments and the attached drawings in order that the present invention is understood better by those skilled in the art.

Figure 1:
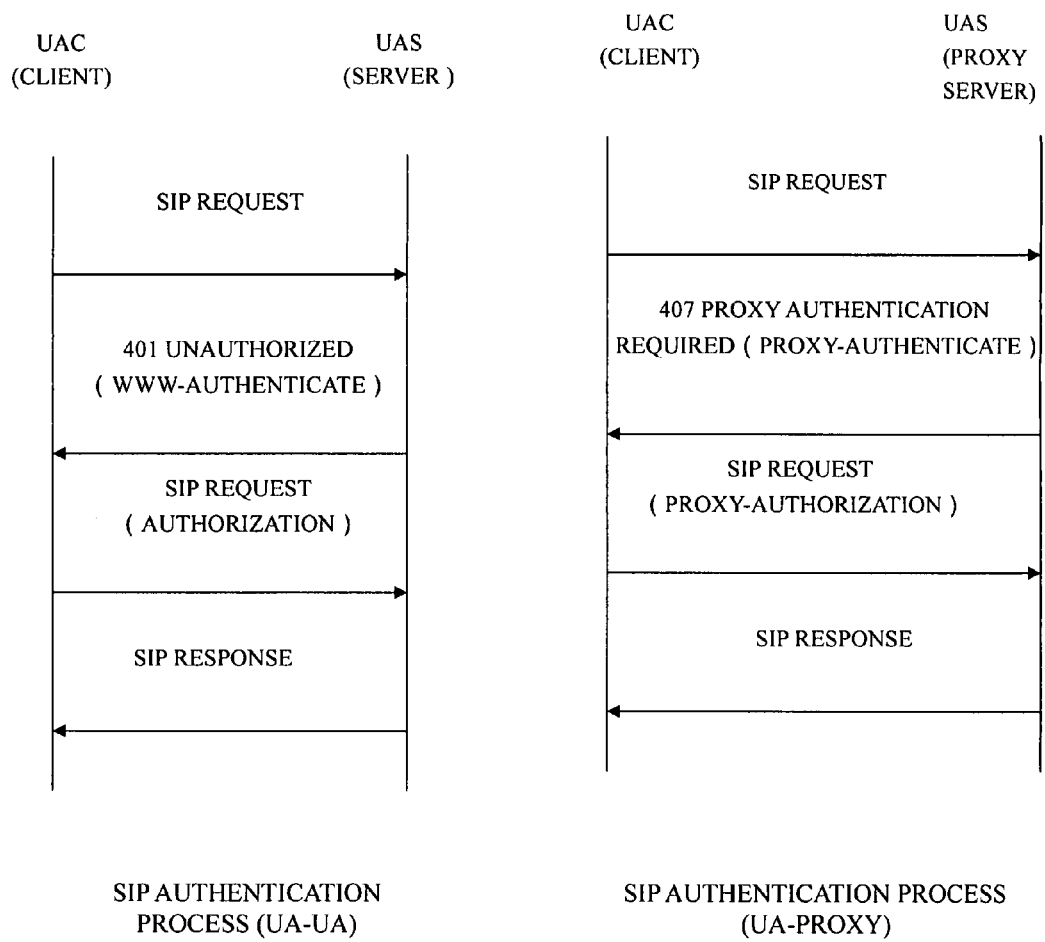
FIG. 1 is an SIP authentication flow in the prior art.
Figure 2:
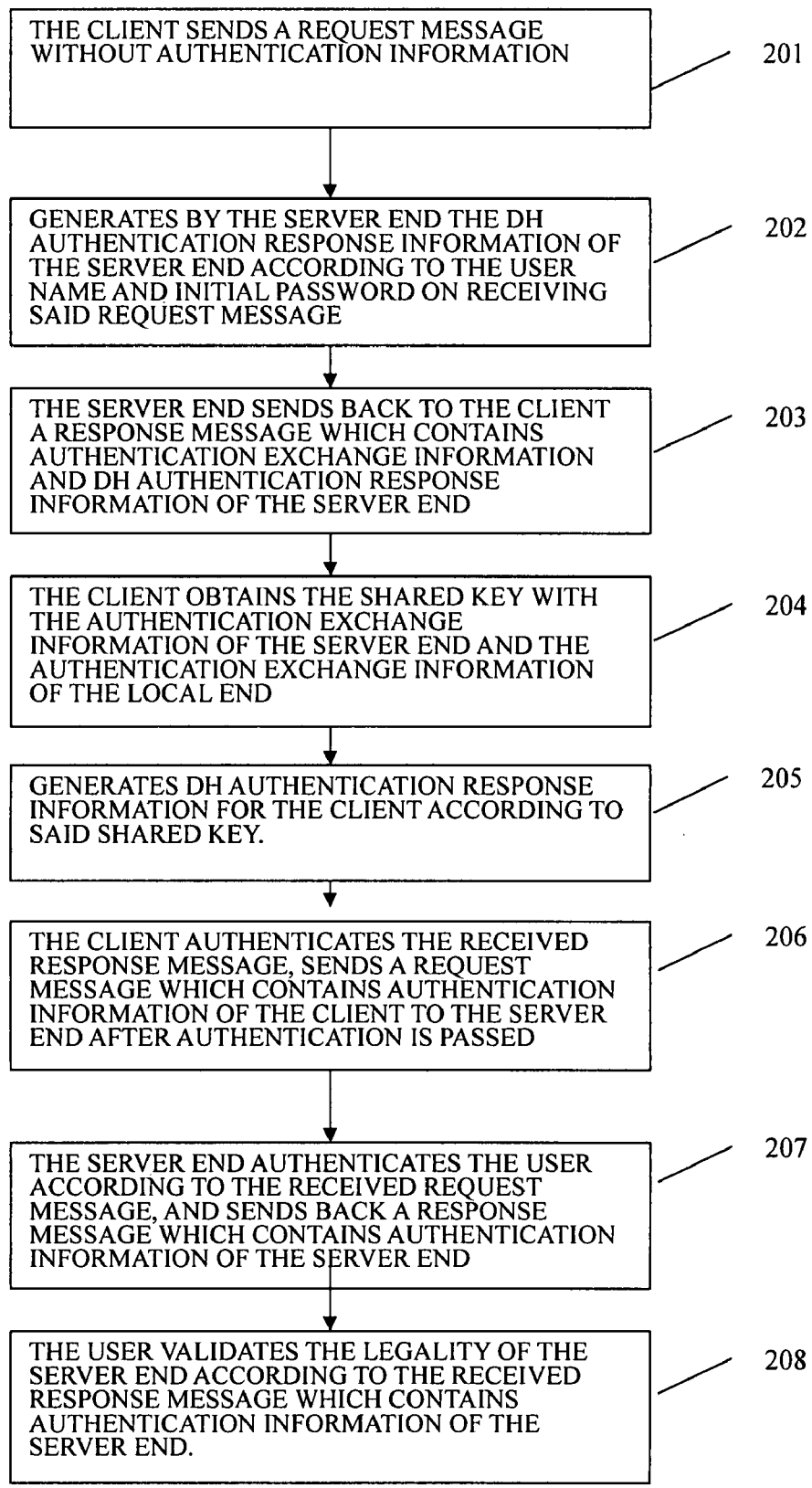
FIG. 2 is a flow diagram of an SIP authentication method provided in an embodiment of the present invention.

Referring to FIG. 2, which shows the detailed flow of the method provided in an embodiment of the present invention, and the method includes the following steps:

Step 201: a client end sends a request message without authentication information to a server end, to request for access. The server end includes a proxy server, a B2B server, a redirect server, and a registrar server.

Step 202: on receiving the request message, the server end generates DH authentication response information of the server end according to the user name and initial key.

Step 203: a response message containing the authentication exchange information of the server end and the DH authentication response information of the server end is sent back to the client end.

Step 204: the client end obtains the shared key according to the authentication exchange information of the server end and authentication exchange information of the local end.

Step 205: The DH authentication response information of the client end is generated according to the shared key.

Step 206: the client end authenticates the received response message, and sends to the server end a request message containing the authentication information of the client after the authentication is passed. The request message containing the authentication information of the client includes: the optional authentication exchange information of the client, and the DH authentication response information of the client.

Step 207: the server end authenticates the user with the received request message, and sends back a response message containing authentication information of the server end. The response message containing authentication information of the server end includes: the optional DH authentication information header field. The DH authentication information header field includes authentication information of the server end.

The request message received by the server end falls in the following two situations: the header field of the message does not include the authentication exchange information of the client end; or the header field of the message contains the authentication exchange information of the client end.

If the header field of the request message does not contain the authentication exchange information of the client end, the server end authenticates the received request message by utilizing the user name and initial key, and generates the DH authentication response information of the server end according to the user name and initial key.

If the header field of the request message contains the authentication exchange information of the client, the server end obtains the shared key according to the authentication exchange information of the user and the authentication exchange information of local end, authenticates the received request message according to the shared key, and generates the DH authentication response information of the server end in accordance with the shared key.

Step 208: the user validates the legality of the server end with the received response message containing the authentication information of the server end.

After the above process is completed, i.e., when the client end and the server end perform message interaction with each other after they have obtained the shared key, only the shared key is used to encrypt the message.

Figure 3:
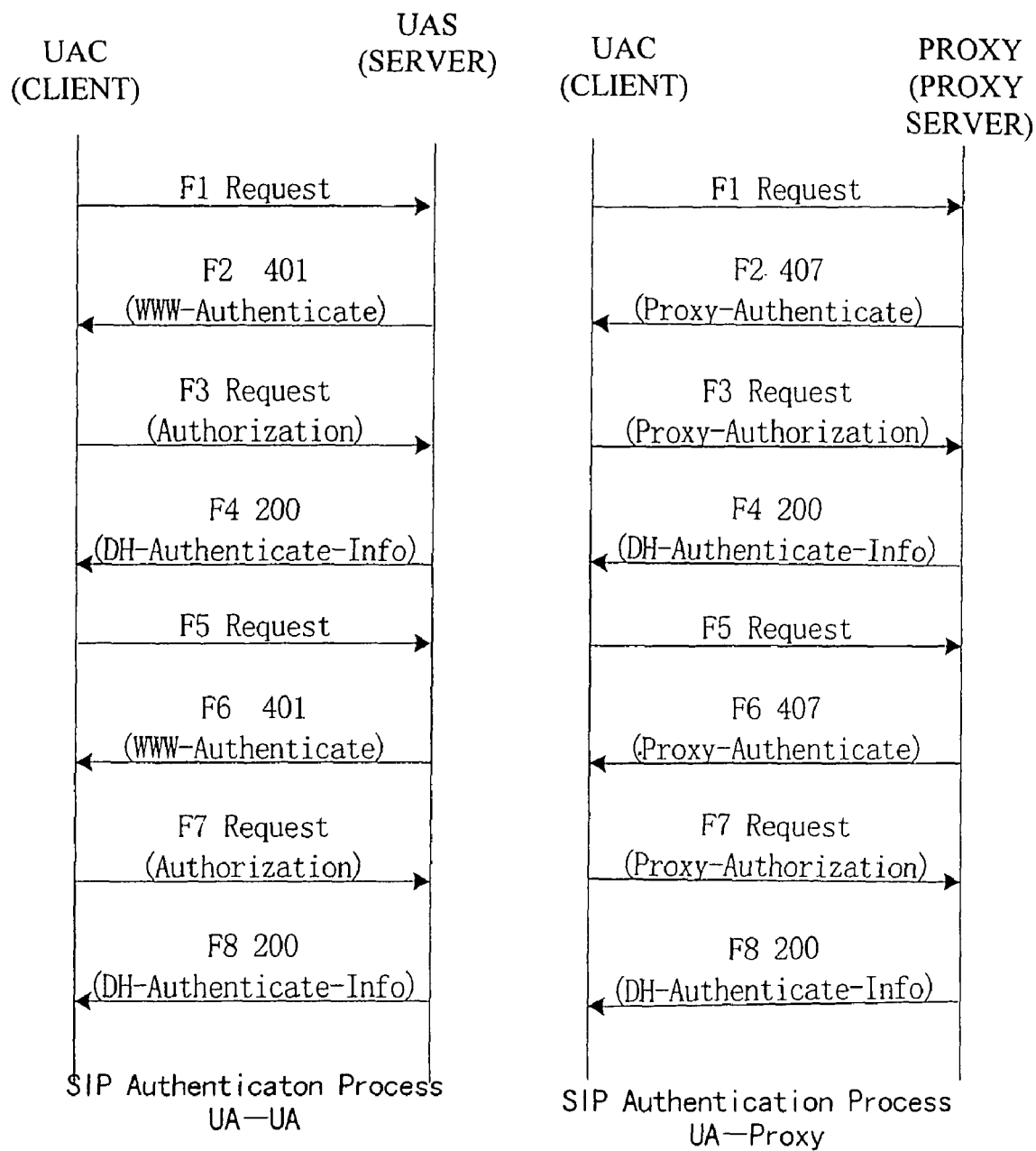
FIG. 3 is a message flow diagram during user access in a method provided in an embodiment of the present invention.

Now refers to FIG. 3, which shows the message flow during user access in the method provided in an embodiment of the present invention:

If a UAS (server end) is to authenticate a UAC (client), it must send a 401 response in which a WWW-Authenticate header field is carried, wherein the header field contains the authentication information of the UAS to prevent Man-in-the-Middle attacks. The UAC can initiate a request again wherein the authentication information is carried in its Authorization header field. The Registrar server and Redirect server can also use the response 401 to authenticate a UAC.

If a Proxy Server is to authenticate a UAC (client), it sends a 407 response in which a Proxy-Authenticate header field is carried, which header field contains the authentication information of Proxy to prevent Man-in-the-Middle attacks. The UAC can initiate a request again wherein the authentication information is carried in its Proxy-Authorization header field.

When the UAC reinitiates a request on receiving a 401 or 407 response, the Call-ID, From header field, and To header field which are identical with the previous request are used, though the sequence number in the CSeq header field is incremented by 1.

However, a Server (a UAS or a Proxy) can not initiate an authentication for an ACK (acknowledge that the client has received the final response to an INVITE) request and a CANCEL request. For a UAC, it is a preferred solution to include the authentication information that the authentication is passed in the ACK message. The authentication information includes the Authorization and Proxy-Authorization header fields, and is carried in the INVITE message corresponding to the ACK message and has passed UAS or Proxy authentication.

In order to prevent the plain text attacks, the UAS or Proxy should include a new header field DH-Authentication-Info in the 2xx response which indicates the successful authentication. The new header field contains the authentication information of the UAS or Proxy and can be used by UAC to authenticate the legality of the UAS or Proxy.

Optionally, if the agreement between UAC and UAS or the Proxy is configured to include DH-Authentication-Info, the UAC can authenticate the legality of the server to which it accessed. If the 2xx response does not contain the DH-Authentication-Info or the authentication fails, and the UAS or the Proxy are configured to include the DH-Authentication-Info, the UAC may deem the message as being intercepted by a malicious server and may choose to reject the server.

During the above authentication, the initial key Ki is only used in the initial authentication procedure, while the shared key Ks is used in the subsequent authentication procedures. For the messages shown in FIG. 3, the key used in F2-F4 is Ki, while the key used in F6-F8 is Ks. Since the Ki presents only once, the plain text attacks and dictionary attacks can be prevented effectively.

Hereunder the extended parameters and the new SIP header field in SIP header fields according to the embodiments of the present invention are detailed.

It is well known to those skilled in the art that four header fields are defined in RFC 3261, i.e., WWW-Authenticate, Proxy-Authenticate, Authorization, and Proxy-Authorization, on the basis of which, the DH-Digest authentication is implemented by extending the parameters in the four header fields in the embodiments of the present invention.

The header fields defined in the invention are as follows:

```
1. WWW-Authenticate="WWW-Authenticate" HCOLON challenge
2. Proxy-Authenticate="Proxy-Authenticate" HCOLON challenge
   Wherein:
   challenge=("Digest" | LWS digest-cln *(COMMA digest-cln))
       / dh-challenge /
other-challenge
   dh-challenge=("DH-Digest" | LWS digest-cln
       *(COMMA digest-cln))
   other-challenge=auth-scheme LWS auth-param*
       (COMMA auth-param)
   digest-cln=realm / domain / nonce / opaque / stale / algorithm
       / qop-options / dh-b / dh-response-auth / auth-param
   realm="realm" EQUAL realm-value
   realm-value=quoted-string
   domain="domain" EQUAL LDQUOT URI*( 1*SP URI) RDQUOT
   URI=absoluteURI / abs-path
   nonce="nonce" EQUAL nonce-value
   nonce-value=quoted-string
   opaque="opaque" EQUAL quoted-string
   stale="stale" EQUAL ( "true" / "false" )
   algorithm="algorithm" EQUAL ( "MD5" / "MD5-sess" / token)
   qop-options="qop" EQUAL LDQUOT qop-value
       *("," qop-value) RDQUOT
qop-value="auth" / "auth-int" / token
dh-b= "DH-B" EQUAL dh-b-value
dh-b-value=quoted-string
dh-response-auth = "DH-Rspauth" EQUAL dh-response-digest
dh-response-digest=LDQUOT 32LHEX RDQUOT
```

Wherein: The underlined items are the new parameters in the header fields.

The above parameters in the WWW-Authenticate and the Proxy-Authenticate header fields are described as follows:

realm: the realm-value is a globally unique character string and includes displayable characters so as to be presented to the user and prompt the user to enter user name and password.

Domain: one or more URI lists enclosed in double quotation marks, indicating that the identical authentication information can be used in these domains. This parameter is not significant in the Proxy-Authenticate header field.

Nonce: nonce is a random character string in Hex or base 64 format provided by the server.

Opaque: opaque is a random character string in Hex or base 64 format provided by the server. The client should make no change to it before returning it to the server.

Stale: this parameter is a flag, with two values, i.e. TRUE or FALSE, used to indicate the failed authentication of the previous request due to the expiration of nonce. If the value of this parameter in the 401/407 response received by the client is TRUE, the Digest may be recalculated by using the new nonce without the need of asking the user to enter user name and password again. This parameter may be set to TRUE only if the nonce in the request received by the server expires but the Digest corresponding to the expired nonce is correct (i.e., user name and password are correct).

Algorithm: it is used to indicate the algorithm for the calculation of Digest at both sides. If this parameter is absent, the algorithm is MD5 algorithm by default.

qop-options: it is an optional parameter introduced for the sake of the compatibility to RFC 2069. It is designed to indicate "quality of protection" supported by the server. This parameter can be assigned with several values, though only two values presently, i.e., "auth" and "auth-int" (the encryption algorithm is slightly different due to the different values). Please refer to the calculation method of Digest described below for the method of usage.

dh-b: It is a parameter specially introduced to implement the DH Digest, representing the number of DH exchanges of the UAS or Proxy. With this parameter, the UAC may calculate the shared key.

If the scheme is DH-Digest, and this dh-b is not included in the WWW-Authentication and Proxy-Authentication, it means that the "db-b" has been sent to the UAC in a previous message by the UAS or Proxy, and the present authentication can use the shared key directly instead of the initial key (in the case that the UAC does not record the shared key, if it is restarted, the initial key can be used in the authentication). If the dh-b is included, it means that the UAS or Proxy wishes to reinitiate a negotiation for the shared key.

dh-response-auth: In order to prevent the 401 or 407 response initiated by a malicious server, the UAC has to authenticate the 401 or 407 response initiated by the UAS or Proxy. The UAS or Proxy must perform the authentication with the initial key (if parameter dh-b exists) or the shared key (if parameter dh-b doesn't exist) when it sends a 401 or 407 response.

auth-param: this parameter is introduced for future extension.

---

3 . Proxy-Authorization="Proxy-Authorization" HCOLON credentials
4 . Authorization="Authorization" HCOLON credentials
Wherein:
credentials = ("Digest" LWS digest-response) / dh-digest-response
/other-response
digest-response=dig-resp *(COMMA dig-resp)
dh-digest-response= dig-resp *COMMA dig-resp)
dig-resp=username / realm / nonce / digest-uri
    / dresponse / algorithm / cnonce
    / opaque / message-qop
    / nonce-count / dh-a / auth-param
username="username" EQUAL username-value
username-value=quoted-string
digest-uri="uri" EQUAL LDQUOT digest-uri-value RDQUOT
digest-uri-value=rquest-uri ; Equal to request-uri as specified by HTTP/1.
message-qop="qop" EQUAL qop-value
cnonce="cnonce" EQUAL cnonce-value
cnonce-value=nonce-value
nonce-count="nc" EQUAL nc-value
nc-value=8LHEX
dresponse="response" EQUAL request-digest
request-digest=LDQUOT 32LHEX RDQUOT
dh-a= "DH-A" EQUAL dh-a-value
dh-a-value= quoted-string -continued auth-param=auth-param-name EQUAL ( token / quoted-string )
auth-param-name=token
other-response=auth-scheme LWS auth-param*(COMMA auth-param)
auth-scheme=token

---

Wherein: The underlined items are the new parameters in the header fields.

The above parameters in the Authorization and the Proxy-Authorization header fields are described as follows:

response: a 128-bit character string denoted by 32 HEX numbers, which is calculated with the following formula.

username: the user name within the specified realm.

digest-uri: identical to the Request-URI in the initial Request-Line. The Request-URI in the request message is not used directly because the intermediate proxy may modify the Request-URI.

message-qop: an optional parameter introduced for the compatibility with RFC 2069, indicating that the "quality of protection" supported by the client. It can only carry one value, which shall be one of the qops from the server. It has influence to the calculation of Digest. If the parameter qop is contained in the WWW-Authenticate or Proxy-Authenticate header field, it is carried in the Authorization or Proxy-Authorization header field as well.

cnonce: if the parameter qop is carried in the WWW-Authenticate or Proxy-Authenticate header field, this parameter is carried in the Authorization or Proxy-Authorization header field as well. Otherwise it is unnecessary to carry this parameter. This parameter is provided by the client, in order to prevent the plain text attacks and provide message integrity protection and mutual authentication.

cnonce-count: if WWW-Authenticate or Proxy-Authenticate header field carries parameter qop, this parameter is carried in the Authorization or Proxy-Authorization header field. Otherwise it is unnecessary to carry this parameter. This parameter is a HEX counter designed to count the number of the request messages from the client which contain that nonce. For example, for a nonce given by the server, the parameter is "nc=00000001" in the first request message sent from the client. The server will store an nc copy of its own, so that it can compare the value of the parameter sent from the client with the stored value, in order to judge whether there are replay attacks.

dh-a: a parameter specially introduced to implement the DH Digest, indicating the number of DH exchanges in the UAC. With this parameter, the UAS or Proxy can calculate the shared key.

If the scheme in the Authorization and Proxy-Authorization header fields is DH-Digest and the header fields contain the parameter dh-a, it indicates the current authentication is encrypted with the initial key. In that case, the validation should be performed with the initial key and the algorithm indicated in dh-a, regardless whether the Challenge (WWW-Authentication and Proxy-Authentication) contains parameter dh-b or not (in this case, it may occur that the UAC restarts and sends a new request, while the UAS or Proxy does not know that the UAC has restarted and still expect the UAC to carry out the authentication with the shared key. At this time, the UAC may perform the authentication with the initial key while neglecting the request from the UAS or Proxy to encrypt with the shared key). If parameter dh-a is not included, it means that the UAC has sent the dh-a to the UAS or Proxy in a previous message and the current authentication is encrypted with the shared key.

In view that the parameters can not be extended according to the ABNF definition of the Authentication-Info header field, a new header field DH-Authentication-Info is added in the method according to an embodiment of the present invention.

```
5. DH-Authentication-Info = "DH-Authentication-Info"
HCOLON dh-ainfo*(COMMA dh-ainfo)
Wherein:
dh-ainfo=nextnonce / message-qop / response-auth
    / cnonce / nonce-count / dh-a
nextnonce="nextnonce" EQUAL nonce-value
response-auth="rspauth" EQUAL response-digest
response-digest=LDQUOT *LHEX RDQUOT
```

The parameters in the above new header field DH-Authentication-Info are described as follows:

This header field may be used by the UAS or Proxy to:

A. modify the nonce: when the client receives this header field containing the parameter nextnonce and wants to send a next request, the client should calculate Digest with the new nonce. If the client calculates Digest with the old nonce, the server will request to authenticate again and carry the parameter "stale" which represents TRUE. In that case, it is unnecessary to carry the parameter dh-a.

B. authenticate itself to the UAC, where it is necessary to carry the parameter response-digest: here, if the parameter dh-b is included, it means that the response-digest is encrypted with the initial key. If the parameter dh-b is not carried, it means that the response-digest is encrypted with the shared key.

Nextnonce: This parameter is a new nonce provided by the server to the client to be used for the next request message.

message-qop: This parameter shall have the same value as the parameter qop sent from the client, indicating the "quality of protection" when the server calculates the response digest.

In order to prevent replay attacks, it is specified that the parameter qop is carried in the above header fields, i.e., WWW-Authenticate, Proxy-Authenticate, Authorization, and Proxy-Authorization, in the method according to an embodiment of the present invention parameter.

The encryption algorithms involved in the above parameters are as follows:

1. Algorithm for dh-response-digest:

```
In view that the parameter qop is optional in the
    WWW-Authenticate and
Proxy-Authenticate and may have multiple options such as "auth" or
"auth-int" or the like, it is
specified compulsively that the qop-value uses only "auth".
    dh-response-digest =<"> <MD5 ( MD5(A1),
    unq(nonce-value)
    ":" unq(qop-value)":" MD5(A2)) <">
wherein:
``` the algorithm for A1 is as follows:

```
If "algorithm" indicates "MD5" or doesn't carry the parameter,
    and the parameter
dh-b is absent, then
    A1 = unq(username-value) ":" unq(realm-value) ":" shared-key
Wherein: shared-key= < shared key calculated by dh-a and dh-b >
    If "algorithm" indicates "MD5" or doesn't carry the
    parameter, and there is the
parameter dh-b, then
    A1 = unq(username-value) ":" unq(realm-value) ":" initial-key
    ":" unq(dh-b)
wherein: passwd= < user's password >
    dh-b= < dh-b-value >
If "algorithm" indicates "MD5-sess" and the parameter
dh-b is absent, then:
    A1=MD5(unq(username-value) ":" unq(realm-value) ":" shared-key)
    ":"
    unq(nonce-value))
If "algorithm" indicates "MD5" or doesn't carry the parameter,
    and there is the
parameter dh-b, then
    A1= MD5(unq(username-value) ":" unq(realm-value) ":"
    initial-key":"
unq(dh-b))
```

The algorithm for A2 is as follows:

A2=Method ":" digest-uri-value

2. Algorithm for request-digest:

```
If the value of "qop" is "auth" or "auth-int", then:
    request-diges=<"><MD5 ( MD5 (A1),unq(nonce-value)
    ":" nc-value":"
    unq(cnonce-value) ":" unq(qop-value) ":" MD5(A2)) <">
wherein,
``` the algorithm for A1 is as follows:

```
If "algorithm" indicates "MD5" or doesn't carry the parameter,
    and the parameter
dh-a is absent, then
    A1 = unq(username-value) ":" unq(realm-value) ":" shared-key
wherein, shared-key= < shared key calculated by dh-a and dh-b >
    If "algorithm" indicates "MD5" or doesn't carry the parameter,
    and there is the
parameter dh-a, then
    A1 = unq(username-value) ":" unq(realm-value) ":"
    initial-key":" dh-a
wherein: passwd= < user's password >
    dh-a= < dh-a-value >
If "algorithm" indicates "MD5-sess" and the parameter
dh-a is absent, then
    A1 = MD5(unq(username-value) ":" unq(realm-value) ":"
    shared-key ) ":"
    unq(nonce-value) ":" unq(cnonce-value)
If "algorithm" indicates "MD5" or doesn't carry the parameter,
    and there is the
parameter dh-a, then:
    A1 = MD5(unq(username-value) ":" unq(realm-value)
    ":"initial-key":" dh-a) ":"
    unq(nonce-value) ":" unq(cnonce-value)
```

The algorithm for A2 is as follows:

```
If "qop" indicates "auth", then
    A2 = Method ":" digest-uri-value
If "qop" indicates "auth-int", then
    A2 = Method ":" digest-uri-value ":" MD5(entity-body)
If the SIP message body is blank, then the H(entity-body) used
    in A2 defined in
RFC2617 is as follows:
    H(entity-body) =MD5("")=
    "d41d8cd98f00b204e9800998ecf8427e"
```

3. Algorithm for Response-Digest:

The algorithm for response-digest is similar to that for request-digest described above, in which the difference lies in the calculation of A2:

```
If the "qop" in the header fields Authorization and
    Proxy-Authorization indicates
"auth", then
    A2 = ":" digest-uri-value
If the "qop" in the header fields Authorization and
    Proxy-Authorization indicates
"auth-int", then
    A2 = ":" digest-uri-value ":" MD5(entity-body)
If the SIP message body is blank, then the H(entity-body) used
    in A2 defined in
RFC2617 is as follows:
    H(entity-body) =MD5("")= "d41d8cd98f00b204e9800998ecf8427e"
```

While the present invention has been illustrated and described with reference to some preferred embodiments of the present invention, those skilled in the art shall appreciate that various variations and modifications can be made without departing from the spirit and scope of the present invention, and these variations and modifications is intended to be covered by the accompanying claims provided that they are within the spirit and scope of the present invention.

The invention claimed is:

1. A Session Initiation Protocol (SIP) authentication method, comprising:
   sending, by a client end, a first request message without authentication information to a server end to request for access;
   sending back, by the server end, a first response message containing authentication exchange information of the server end and Diffie-Hellman (DH) authentication response information of the server end;
   authenticating, by the client end, the server end according to the first response message, and sending by the client end a second request message containing authentication information of the client end to the server end, after the authentication of the server end is passed, wherein the authentication information of the client end comprises: DH authentication response information of the client end, or, authentication exchange information of the client end and DH authentication response information of the client end;
   authenticating, by the server end, a user of the client end according to the second request message containing authentication information of the client end, and sending back by the server end a second response message which contains the authentication information of the server end, wherein the process of authenticating by the server end a user of the client end according to the second request message comprises:
   authenticating, by the server end, the second request message according to a user name and an initial key if the header field of the second request message does not contain the authentication exchange information of the client end;
   obtaining, by the server end, a shared key according to the authentication exchange information of the client end and authentication exchange information of the server end, and authenticating, by the server end, the second request message according to the shared key, if the header field of the second request message contains the authentication exchange information of the client end; and
   authenticating, by the client end, the legality of the server end according to the second response message.

2. The method according to claim 1, wherein, before the process of sending back a first response message, the method comprises:
   generating, by the server end, DH authentication response information of the server end according to a user name and an initial key.

3. The method according to claim 1, wherein, before the process of authenticating the server end by the client end according to the first response message and sending by the client end a second request message, the method comprises:
   obtaining a shared key by the client end according to the authentication exchange information of the server end and the authentication exchange information of the client end; and
   generating the DH authentication response information of the client end by use of the shared key;
   wherein the DH authentication response information of the client end is the authentication information of the client end.

4. The method according to claim 1, wherein, before the process of sending back a second response message, the method further comprises:
   generating, by the server end, the DH authentication response information of the server end according to a user name and an initial key, if the header field of the second request message does not contain the authentication exchange information of the client end; and
   obtaining, by the server end, a shared key according to the authentication exchange information of the client end and authentication exchange information of the server end, and generating, by the server end, the DH authentication response information of the server end according to the shared key, if the header field of the second request message contains the authentication exchange information of the client end.

5. The method according to claim 1, wherein the second response message contains: a DH authentication information header field.

6. The method according to claim 5, wherein the DH authentication information header field contains: the authentication information of the server end.

7. The method according to claim 4, wherein the method further comprises:
   encrypting the messages with only the shared key when both of the client end and server end perform message interaction with each other after obtaining the shared key.

8. The method according to claim 1, wherein the server end comprises: a proxy server, a back-to-back server, a redirect server, or a registrar server.

9. The method according to claim 1, wherein the second response message contains: a DH authentication information header field.

10. A Session Initiation Protocol (SIP) authentication system, comprising:
    a client end computer; and
    a server end computer;
    wherein, the client end computer is configured to send a first request message without authentication information to the server end computer to request access and the server end computer is configured to send back a first response message containing authentication exchange information of the server end computer and a Diffie-Hellman (DH) authentication response information of the server end computer;

wherein the client end computer is further configured to authenticate the server end computer according to the first response message, and send a second request message containing authentication information of the client end computer to the server end computer, after the authentication of the server end computer is passed, wherein the authentication information of the client end computer comprises: DH authentication response information of the client end, or authentication exchange information of the client end and DH authentication response information of the client end;

wherein the server end computer is further configured to authenticate a user who uses the client end computer according to the second request message containing authentication information of the client end computer, and send back a second response message which contains the authentication information of the server end computer, wherein the server end computer for authenticating a user of the client end computer according to the second request message is further configured to:

authenticate the second request message according to a user name and an initial key if the header field of the second request message does not contain the authentication exchange information of the client end;

obtain a shared key according to the authentication exchange information of the client end and authentication exchange information of the server end, and authenticating, by the server end computer, the second request message according to the shared key, if the header field of the second request message contains the authentication exchange information of the client end; and the client end is further configured to authenticate the legality of the server end according to the second response message.

* * * * *